United States Patent

[11] 3,602,519

[72] Inventors John J. Bubbers
Huntington, L.I.;
John P. Kuehn, Dix Hills, L.I.; James E. Fox, Eaton's Neck, L.I., all of, N.Y.
[21] Appl. No. 849,696
[22] Filed Aug. 13, 1969
[45] Patented Aug. 31, 1971
[73] Assignee Pickering and Company, Inc.
Plainview, N.Y.

[54] PHONOGRAPH CARTRIDGE MOUNTING PLATFORM
5 Claims, 5 Drawing Figs.

[52] U.S. Cl. ........ 274/24
[51] Int. Cl. ........ G11b 3/02
[50] Field of Search ........ 274/24, 37

[56] References Cited

UNITED STATES PATENTS

| | | | |
|---|---|---|---|
| 2,517,423 | 8/1950 | Gillmor | 274/24 |
| 2,693,363 | 11/1954 | Proctor | 274/24 X |
| 2,951,915 | 9/1960 | Dearson | 274/24 X |
| 3,120,393 | 2/1964 | Pennucci | 274/23 |

*Primary Examiner*—Harry N. Haroian
*Attorney*—Kane, Dalsimer, Kane, Sullivan and Kurucz

ABSTRACT: A platform is provided adapted to facilitate the mounting of a phonograph cartridge to the head of a phonograph tone arm. The platform includes a base member having a pair of resilient sides extending outwardly beyond one face adapted to receive and securely retain the cartridge thereto and means affixed to the other face of the platform to couple the platform to the phonograph tone arm head.

INVENTORS
JOHN J. BUBBERS
JOHN P. KUEHN
JAMES E. FOX
BY
Kane, Dalsimer, Kane, Sullivan & Kurucz
ATTORNEYS INVENTORS
JOHN J. BUBBERS
JOHN P. KUEHN
JAMES E. FOX
BY
Kane, Dalsimer, Kane, Sullivan & Kurucz
ATTORNEYS

PHONOGRAPH CARTRIDGE MOUNTING PLATFORM

BACKGROUND OF THE DISCLOSURE

A common type of phonograph cartridge comprises a relatively small casing having a record engaging stylus extending outwardly from the bottom thereof. The casing contains the necessary transducing means for converting the movement of the stylus to an electrical signal and is also provided with electrical terminals for connecting the transducer to suitable preamplification or amplification equipment. A mounting bracket in the form of a clip is affixed to the top of the casing for connecting the cartridge to the phonograph tone arm.

Due to excessive use or mishandling, it often becomes necessary to replace such cartridges for maximum phonograph performance. Although such replacement may easily be accomplished by a skilled technician having the proper tools, it is somewhat difficult for the average, unskilled layman to disconnect the existing cartridge and replace it with a new cartridge. This is particularly so because of the relatively small size of the components involved.

It is therefore the principal object of the present invention to provide a mounting platform for a phonograph cartridge or the like which serves as an intermediate piece between the cartridge and tone arm and simplifies the task of coupling the cartridge to the tone arm.

SUMMARY OF THE INVENTION

This and other beneficial objects and advantages are attained in accordance with the present invention by providing a platform comprising a base member having a pair of resilient arms extending outwardly beyond one face adapted to receive and secure the cartridge thereto and having means affixed to the opposite face to couple the platform to the phonograph tone arm head.

DETAILED DESCRIPTION OF THE PREFERRED EMBODIMENT

Figure 1:
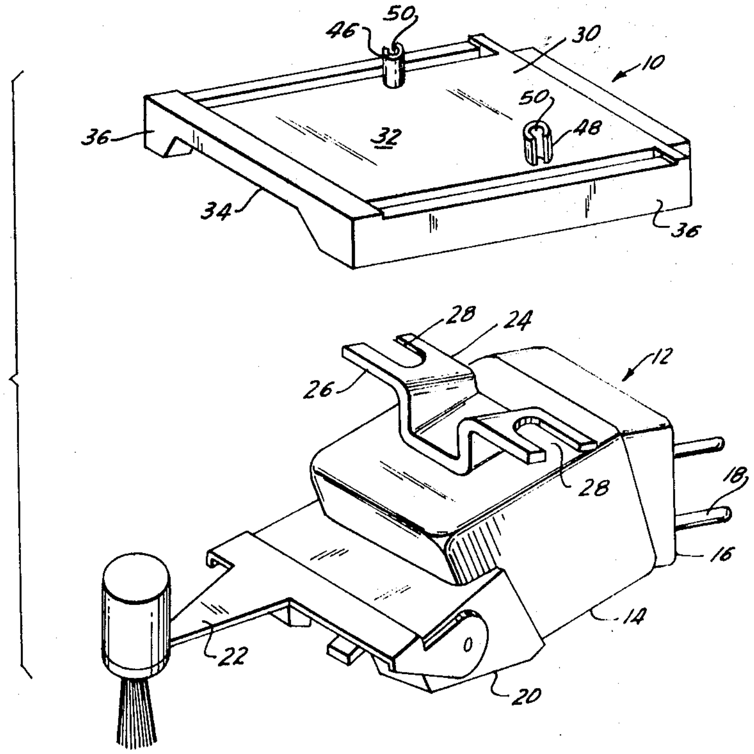
FIG. 1 is an exploded perspective view of a phonograph cartridge mounting platform in accordance with the present invention and an associated phonograph cartridge.
Figure 2:
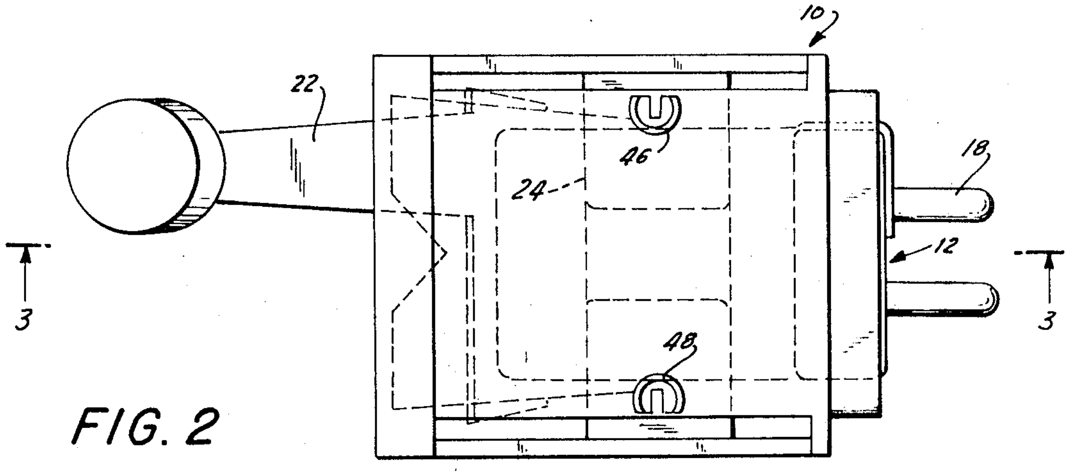
FIG. 2 is a top plan view of the assembled cartridge and mounting platform; for clarity, the tone arm head has been removed.

The present invention is illustrated in the accompanying drawings wherein similar components bear the same reference numeral throughout the several views. Reference is now made to FIG. 1 in particular, wherein the cartridge-mounting platform 10 of the present invention is shown with an associated cartridge 12. Cartridge 12 comprises a casing 14 having a terminal block 16 with electrical contacts 18 extending outwardly from the rear end and a stylus assembly 20 and brush assembly 22 mounted to the forward end. The cartridge may, for example, comprise the improved phonographic pickup and stylus assembly disclosed in the commonly assigned and presently pending U.S. Pat. application Ser. No. 790,053 filed on Jan. 9, 1969.

A mounting bracket 24 is affixed to the top surface of cartridge casing 14. Bracket 24 includes a generally U-shaped member 25 connected to the casing at the base of the U and having a pair of flanges 26 affixed to the free ends of the U which extend transverse to the longitudinal axis of the casing beyond the sides of the casing. The flanges are each provided with a screw slot 28. Heretofore such cartridges were mounted to the phonograph tone arm head with screws extending through the slots into suitable screw holes in the arm.

Platform 10 comprises a generally flat base member having a top face 32 and a bottom face 34. Sidewalls 36 extend downwardly from base 30 beyond bottom face 34. The width of base member 30 and hence, the spacing between sidewalls 36, is substantially equal to the overall length of bracket 24 measured from the tips of the opposed bracket flanges 26 in accordance with the following modifications. Thus, as seen most clearly in FIG. 4, each sidewall 36 includes an inwardly projecting ledge 38 spaced downwardly from the bottom face of base member 34 a distance substantially equal to the thickness of the bracket 24. The portions 40 of sidewalls 36 disposed above ledge 38 are spaced apart from each other a distance substantially equal to or slightly greater than the overall length of bracket 24. The portions 42 of sidewall 36 disposed below ledge 38 are spaced apart from each other a distance less than the overall length of bracket 24. Thus, a pocket is defined between the bottom face of base member 32 and ledges 38 to receive and retain cartridge bracket 24. The top face of each ledge 38 is inclined slightly to ensure the positive gripping of he cartridge by platform 10 in use. Also, the inner face 44 of the lower portions 42 of sidewalls 36 each incline inwardly from the free end to the associated ledge 38. The inclined portions of the sidewalls serve as camming surfaces to guide the cartridge bracket into the pocket defined between the ledges and platform base.

The platform may be formed of any material sufficiently resilient to allow the sidewalls 36 to be spread apart, to enable the cartridge to be positioned therebetween, and thereafter returned to their initial position, to securely retain the cartridge in position. In this connection, a molded member formed of nylon has been found to operate particularly well in the commercial embodiment of the invention.

Two split lugs, 46 and 48 extend upwardly from the top face 32 of base member 30. Each lug is provided with a longitudinally extending slot 50. Lugs 46 and 48 serve as quick-connect fastening means between the platform and the head of the phonograph tone arm. Accordingly, the lugs are positioned on the platform base so as to properly align the cartridge with respect to the tone arm mounting screw holes. The diameters of lugs 46 and 48 are slightly larger than the diameter of the screw holes in the tone arm. However, the longitudinally extending slot 50 in each lug is sufficiently wide to permit the lug to be compressed to fit within the tone arm screw holes.

Figures 3, 4, 5:
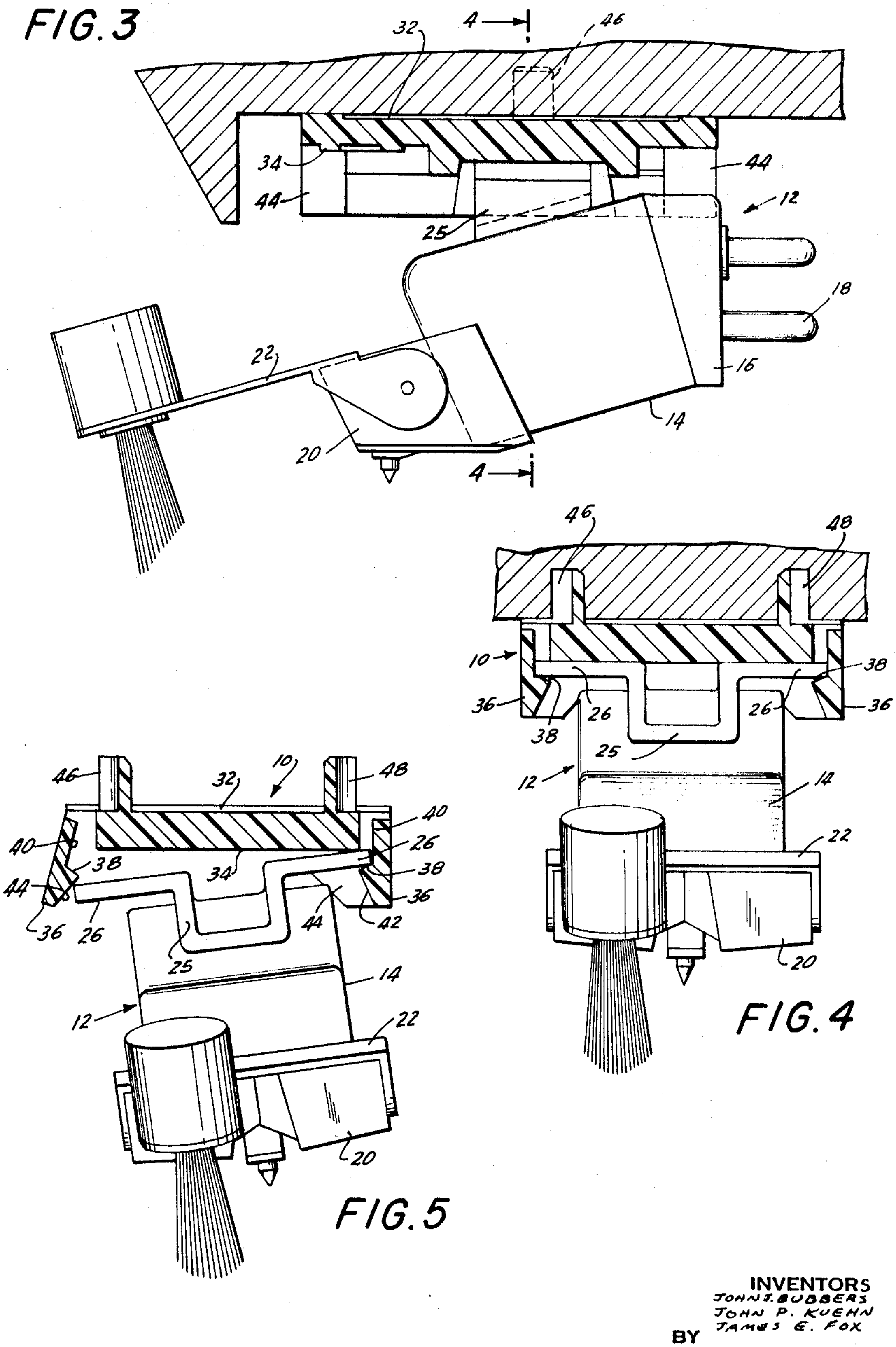
FIG. 3 is a sectional view taken along reference line 3—3 of FIG. 2 in the direction indicated by the arrows showing the cartridge-carrying platform coupled to the head of a phonograph tone arm.
FIG. 4 is a sectional view taken along reference line 4—4 of FIG. 3 in the direction indicated by the arrows.
FIG. 5 is a view similar to FIG. 4 illustrating the simplified method of mounting a phonograph cartridge to the mounting platform of the present invention.

In use, a cartridge is mounted to platform 30 by first positioning one flange 28 between a ledge 38 of the platform and the bottom face of the platform base. Thereafter, the other flange is permitted to ride along the camming surface of the opposite sidewall, thereby distorting that sidewall by forcing it outwardly. This is shown in FIG. 5. After both flanges seat in the pocket between the sidewall ledges and the platform base, the distorted sidewall will relax and assume its normal position, thereby securing the cartridge firmly in position. The cartridge-carrying platform may then be mounted to the tone arm by merely pressing the retaining lugs 46 and 48 into the mounting screw holes of the tone arm head. The lugs, after being distorted to fit into the threaded inner surfaces of the mounting holes as a result of cold flow will expand to frictionally engage the surfaces of the head defining the holes. The electrical contacts of the tone arm may then be connected to the contacts of the cartridge terminal block, thereby completing the cartridge installation.

Thus, in accordance with the above description, the aforementioned object is effectively attained and a mounting platform is provided to facilitate the securing of a phonograph cartridge to a phonograph tone arm.

We claim:

1. A mounting platform adapted to be interposed between the head of a phonograph tone arm and a cartridge to be mounted to said tone arm head, said cartridge being of the type provided with a mounting bracket including a pair of flanges extending transverse to the longitudinal axis of the cartridge casing, said platform comprising: a generally flat base member having a top and bottom face; a pair of sidewalls, having portions spaced apart from each other a distance sufficient to engage said cartridge mounting bracket therebetween, resiliently coupled to said base member extending downwardly beyond said bottom face whereby to enable said sidewall portions to be spread apart for placement of said cartridge mounting flanges therebetween whereafter said sidewalls will relax and assume their normal position retaining said cartridge therebetween and, means coupled to said platform base adapted to secure said platform to said tone arm.

2. The invention in accordance with claim 1 wherein each of said sidewalls further include an inwardly extending ledge spaced downwardly from said base member bottom face a distance substantially equal to the thickness of said cartridge-mounting bracket flanges, a first portion of each of said sidewalls disposed above said ledge, said sidewall first portions being spaced apart from each other a distance substantially equal to the overall length of said cartridge-mounting bracket measured from the tips of said bracket flanges, and second portions of each of said sidewalls disposed below said ledge, said second portions being spaced apart from each other a distance less than the overall length of said bracket.

3. The invention in accordance with claim 3 wherein each of said sidewalls tapers inwardly from the free end thereof to the associated ledge whereby to define a camming surface adapted to cooperate in guiding said cartridge bracket to said sidewall first portion.

4. The invention in accordance with claim 1 wherein said tone arm head includes surfaces thereon defining screw holes therein and said platform coupling means include a lug extending outwardly beyond said base member top face, said lug being adapted to frictionally engage said tone arm had surfaces.

5. The invention in accordance with claim 5 wherein the diameter of said lug is slightly greater than the diameter of said screw hole, said lug is formed of a resilient material, and further including a slot extending longitudinally along said lug wherein said lug is adapted to be diametrically compressed to fit into said tone arm screw hole whereafter said lug relaxes and expands to frictionally engage said screw hole defining surfaces.